July 14, 1959   E. P. DAVIS   2,894,683
MECHANICAL INDICATING APPARATUS FOR COMPUTING MACHINES
Filed Oct. 24, 1955   2 Sheets-Sheet 1
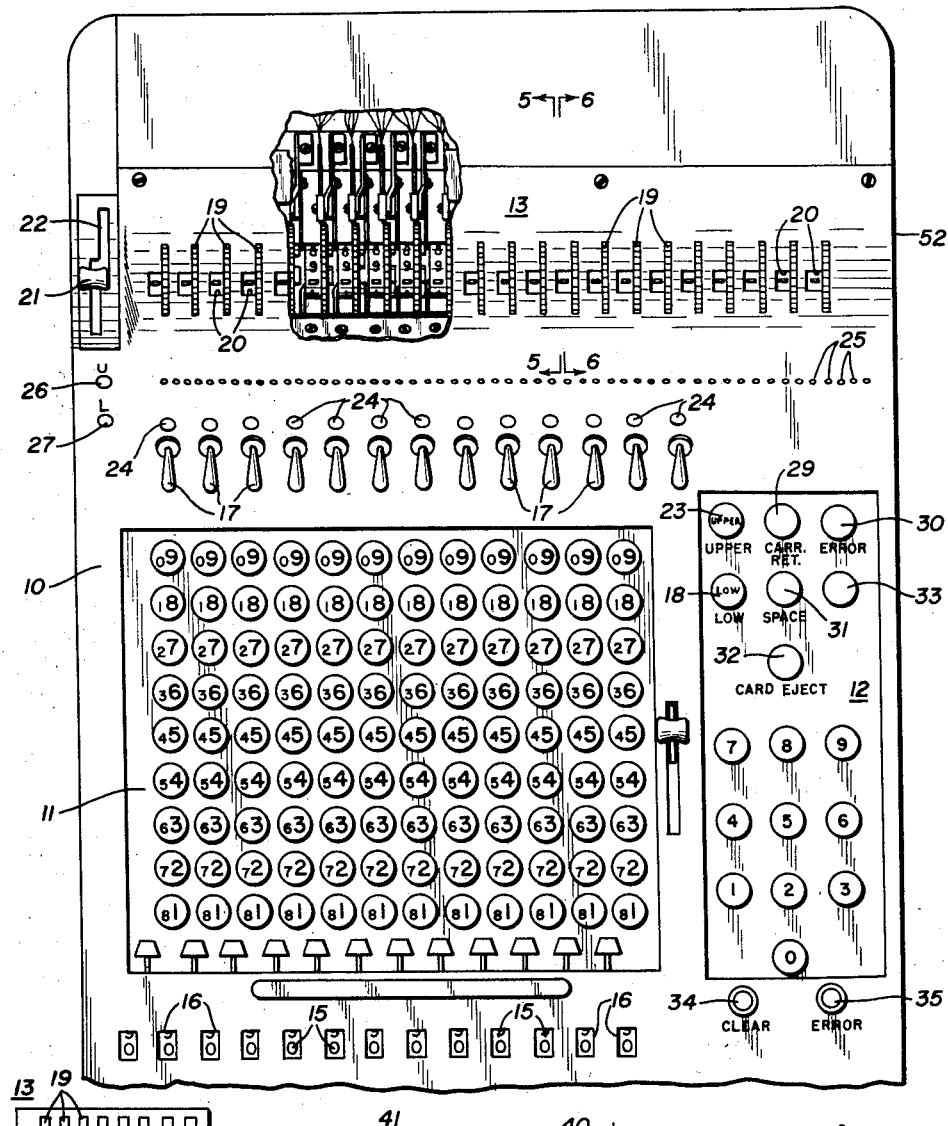
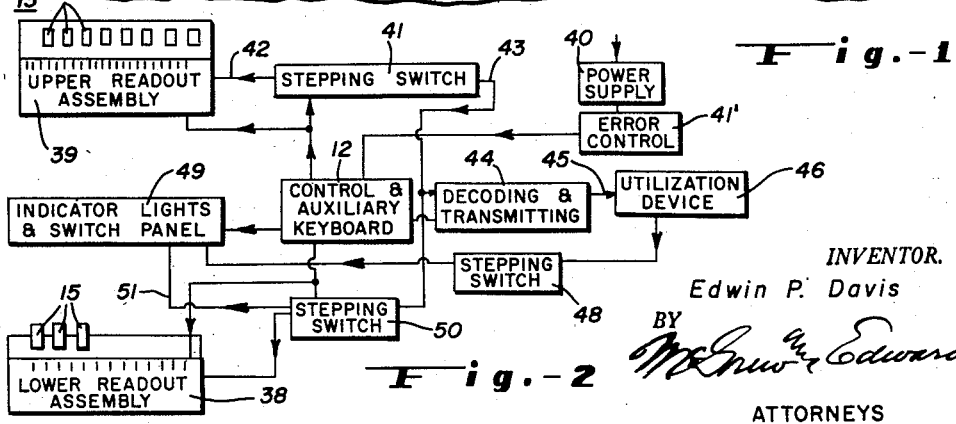
Fig.-1
Fig.-2
INVENTOR.
Edwin P. Davis
BY
ATTORNEYS July 14, 1959     E. P. DAVIS     2,894,683
MECHANICAL INDICATING APPARATUS FOR COMPUTING MACHINES
Filed Oct. 24, 1955     2 Sheets-Sheet 2

INVENTOR.
Edwin P. Davis
BY
ATTORNEYS

United States Patent Office 2,894,683
Patented July 14, 1959

2,894,683

MECHANICAL INDICATING APPARATUS FOR COMPUTING MACHINES

Edwin P. Davis, Denver, Colo., assignor, by mesne assignments, to Van Norman Industries, Inc., New York, N.Y.

Application October 24, 1955, Serial No. 542,251

5 Claims. (Cl. 235—61)

This invention relates to a mechanical indicating device for indicating and transmitting information for recording and particularly to such apparatus having rotatable indicating elements and mechanism for transmitting signals corresponding to the positions thereof.

Modern business practice requires calculating and recording machines of various types. In the course of the recording of calculations in many business operations, it is necessary to record the same information in connection with each operation of a series of calculations or transactions. Thus, it is desirable to provide an indicating device the elements of which may be set up easily to record the required information and which may be locked in position to retain the information over a substantial period of time; furthermore, it is desirable that the indicating apparatus be easily restored to its initial or neutral position. In order to avoid error in the reading and recording of the information indicated by such apparatus, it is desirable that the information be transmitted without the necessity of the operator's reading and recording the information each time it is used. Accordingly, it is an object of this invention to provide an improved mechanical indicating apparatus which may easily be set to indicate desired information and may be locked in position to retain the information but may readily be released to restore the apparatus to its initial position.

It is another object of this invention to provide an improved indicating apparatus for recording information and for reading out and transmitting the information.

It is a further object of this invention to provide a mechanical indicating apparatus employing a rotatable indicating wheel and including an improved device for positioning and locking the wheel and for releasing the wheel for return to its initial position.

It is a further object of this invention to provide a mechanical indicating and signal transmitting apparatus employing a rotatable indicating wheel and including an improved device for preventing the transmission of indicating signals when the wheel is in an neutral position.

Further objects and advantages of this invention will become apparent as the following description proceeds and the features of novelty which characterize this invention will be pointed out with particularity in the claims annexed to and forming a part of this specification.

The indicating apparatus of this invention is particularly suitable for use in connection with calculating and recording apparatus such as that disclosed and claimed in a co-pending application of Edwin P. Davis, the present inventor, Serial No. 436,185, filed June 11, 1954, and the invention is illustrated and described herein as applied to an apparatus of the type disclosed in this co-pending application.

Briefly, in carrying out the objects of this invention, a calculating and recording apparatus provided with mechanism for transmitting signals indicating the positions of the calculating elements of the apparatus is provided with an additional row of indicating wheels, each of which may be manually adjusted to its desired position. Each of the wheels of this additional row is divided into eleven equal segments representing the ten digits and a neutral posiiton. A combined positioning and locking device is provided so that the wheel may easily be moved to its desired indicating position and after all the wheels have been set as desired, the device may be locked so that the wheels cannot be unintentionally moved from their required indicating position. The locking device is a simple three-position rotating cam shaft which may easily be moved by the operator, a handle being provided for this purpose which has three positive easily determined positions representing the free rotating locked and released positions of the apparatus. Each of the wheels is provided with a set of indicating cams or stops and is arranged so that a set of contact or switch fingers may be brought into engagement with the stops when the wheel is in position and will provide an electric signal corresponding to the position of the wheel. The stop or cam provided to represent the neutral position of the wheels is arranged so that it renders ineffective the signal forming apparatus so that no signal may be transmitted from any of the wheels which are in their neutral positions.

For a better understanding of this invention, reference may be had to the accompanying drawings in which:

Fig. 1 is a plan view of a calculating and recording machine provided with a mechanical indicating apparatus embodying the invention;

Fig. 2 is a block diagram of the signal transmitting circuits of the apparatus of Fig. 1;

Figure 3:
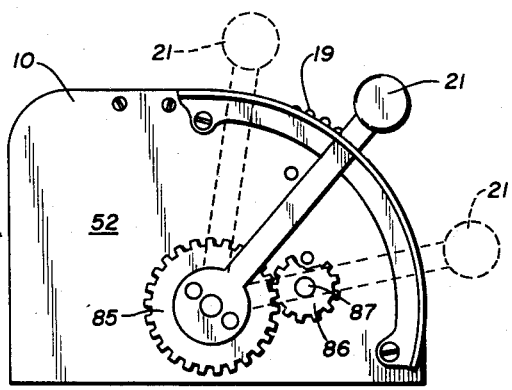
Fig. 3 is an enlarged end view of the indicating apparatus of Fig. 1 with the side plate removed.

Referring now to the drawing, there is shown in Fig. 1 a combined calculating machine and registering and signal transmitting equipment having a casing 10 within which is mounted a calculating machine 11, a control panel and auxiliary keyboard 12, and an information indicating and registering unit 13 embodying the invention. Within the casing 10 there is also arranged apparatus for reading out the results appearing on the calculating machine 11 and on the indicating unit 13 and for decoding and transmitting signals corresponding to the indicated results, this apparatus being of the type disclosed and claimed in the aforesaid co-pending application. During the operation of the equipment, calculations are made on the machine 11 and appear on a series of thirteen indicating wheels 15 which are visible through corresponding rectangular windows 16 in the casing 10. By operating the corresponding one of a series of thirteen toggle switches 17, the operator may prevent the transmission of signals from selected ones of the indicator wheels 15. In order to transmit coded information from the indicator wheels 15, the operator depresses a button 18 of the auxiliary keyboard 12 which causes a readout mechanism to be actuated.

In many business operations, it is desirable to include with the calculated information other information such as coded information relating, for example, to the products and sources of the goods to which the calculations relate. In the apparatus illustrated, such information may be transmitted through the coding system by operation of the digit keys of the auxiliary keyboard 12. In many of the business operations, the same information is applicable to an extensive series of calculations and it is for this reason that the unit 13 is provided. The unit 13 comprises a series of twenty-two indicator wheels 19 having numerals visible through rectangular sight openings 20 in the upper rear end portion of the casing 10. This portion of the casing projects substantially above the level of the calculating machine 11 and includes the sloping panel on which are mounted the toggle switches 17. The wheels 19 are knurled so that the operator may easily move them to the position required to indicate the desired digits, and, after the desired ones of the wheels have been set, they are all locked by moving a lever 21 to its top position in the staggered slot 22. After the desired ones of the wheels 19 have been set in this manner, information from the wheels may be transmitted through the coding and transmitting system by operation of the upper button 23 of the control 12. Each of the wheels 19 has eleven positions representing the nine digits, zero and a neutral position. When a wheel is in the neutral position, no signal can be transmitted from that wheel upon operation of the coding and transmitting equipment. When the operator has finished with the use of the information set up on a unit 13, he may release all the wheels and cause them to return to their neutral positions by moving the lever 21 to the bottom position in the slot 22. When the lever 21 is in the intermediate position, shown in the drawing, all of the wheels 19 may be moved as desired to selected positions. The details of the construction and operation of the unit 13 are described below.

Each of the toggle switches 17 is provided with a corresponding signal light 24 which is energized when the switch is in its position for transmitting signals from the indicator wheel 15 so that the operator can see readily which columns of the calculating machine have been selected for use. A row 25 comprising forty-five signal lights is provided to indicate the number of signals which have been transmitted during each operation of the machine. For example, if signals are transmitted from the thirteen indicator wheels 15, the first thirteen of the lights in the row 25 will be lighted in turn and the signal light corresponding to the thirteenth position will remain lighted. If now the button 23 is depressed to transmit signals from the twenty-two wheels 19, the signal light for the thirty-fifth position will be energized. In the event that any of the indicator wheels 15 or 19 have been cut out, either by operation of the switches 17 or the positioning of the wheels 19 in their neutral position, no signal will be transmitted and a corresponding lesser number of lights will be energized.

The signal information transmitted by the equipment illustrated in Fig. 1 may be utilized by any suitable type of recording apparatus. For example, the signal information may be transmitted to and recorded on either punched tape or magnetic tape or may be applied to operate a card punching machine. Card or key punch machines normally are arranged to punch a large number of columns or positions and the present equipment is arranged to transmit signals for punching ninety columns. Upper and lower signal lights 26 and 27 at the left end of the row of lights 25 are provided to indicate upper and lower fields of a ninety column card so that forty-five columns may be punched in each card field, the corresponding signal light 26 or 27 indicating whether signals for the upper or lower card field, respectively, are being transmitted.

The manual control 12 may include any desired control buttons for securing the required operation of the equipment in conjunction with the various types of recording machines; and, in the illustrated embodiment, the control panel or keyboard 12 includes buttons for transmitting the nine digits and zero and in addition to the buttons 18 and 23 which control the operation of the readout mechanisms for the calculating machine 11 and for the indicating unit 13, respectively. The control panel also includes a carriage return button 29, an error button 30, a space button 31, a card eject button 32, and a back spacer button 33. Faulty operation of the calculating machine 11 is indicated by the de-energizing of a green clear light 34 and the energizing of a red error light 35. When a faulty operation of a key of the calculating machine has occurred no signal can be transmitted from the indicating wheels 15 of the calculating machine 11 until the faulty operation has been corrected on the calculating machine 11. For further information as to the details of this portion of the control, reference may be had to the aforementioned co-pending application.

The general arrangement of the control system of which the calculating, registering and signal transmitting unit is a part is shown on the schematic diagram, Fig. 2. In order to transmit signals corresponding to the positions of the wheels 15 in the calculating machine 11, a lower readout assembly 38 is provided which may be of the construction disclosed in the aforesaid co-pending application. In a similar manner, the equipment provides for reading out the positions of the indicator wheels 19 and a readout assembly 39 is provided for this purpose. Power for actuating the control system is provided from a power supply 40 through the faulty operation control switch assembly 41' to the manual control on calculating machine 11. Upon operation of the upper control button of the control panel 12, power is supplied to the upper readout assembly and to a stepping switch assembly 41 which is connected by a cable 42 to an upper readout assembly. The operation of the stepping switch 41 scans the twenty-two indicator units 19 and transmits the corresponding signals through a connection 43 to a decoding and transmitting equipment 44. The signal decoded by the equipment 44 is transmitted through a cable 45 to a utilization device 46. During the operation fo this equipment, the several indicator lights, including the signal lights 25 and the toggle indicator lights 24, are energized in accordance with the stage of operation. The column position lights 25 are actuated by a stepping switch 48 connected between the utilization device 46 and the indicator light panel 49. When the lower control button of the control 12 is pressed, the lower readout assembly for indicating the positions of the indicator wheels 15 of the calculating machine is operated and the signals are read out in turn by a stepping switch control 50 by which they are supplied successively in turn to the decoding and transmitting equipment 44 and thence to the utilization device. During the operation of the stepping switch 50, the signals are transmitted from those indicator wheels 15 which are connected for operation by corresponding ones of the toggle switches 17, the stepping switch 50 being connected through a cable 51 to the unit 49 including the toggle switches. The construction of the upper and lower readout assemblies is essentially the same, the principal difference being that the upper readout assembly does not require a series of switches such as the toggle switches 17 in order to prevent the reading out of the positions of the indicator wheels which are not being used. This difference is secured by providing on each of the indicator wheels 19 the neutral position referred to above wherein no signal may be transmitted from the wheel.

The details of construction of the upper readout assembly are shown in Figs. 3–9 inclusive.

Figure 4:
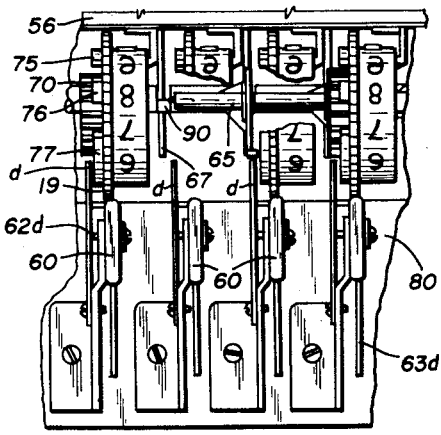
Fig. 4 is an enlarged top plan view of a portion of the signal transmitting apparatus with several parts broken away.
Figure 7:
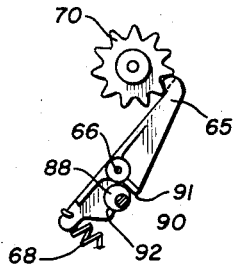
Fig. 7 is a view of a portion of the apparatus as shown in Fig. 6 showing the locking mechanism in its locked position.
Figure 5:
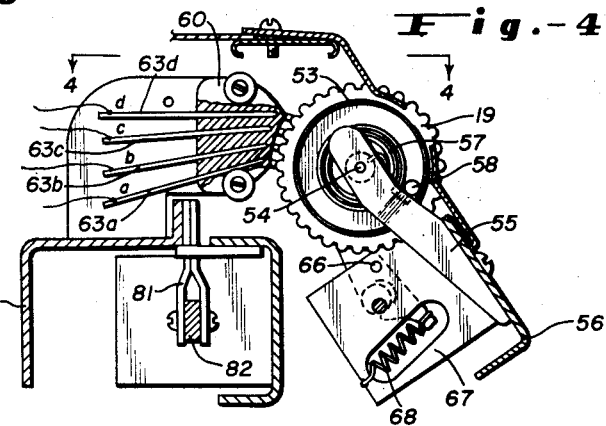
Fig. 5 is an enlarged view along the line 5—5 of Fig. 1.
Figure 6:
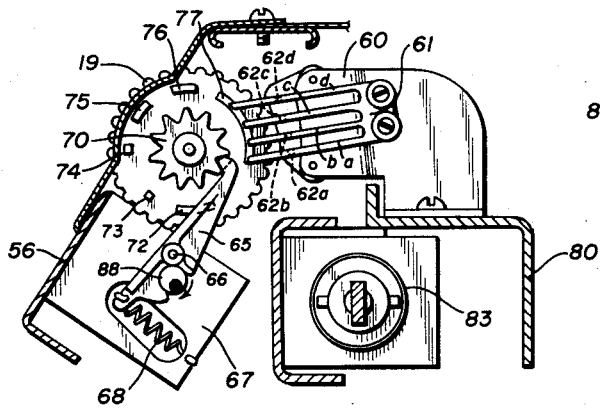
Fig. 6 is an enlargd sectional elevation view along the line 6—6 of Fig. 1.
Figure 8:
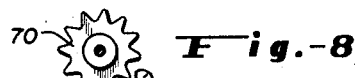
Fig. 8 is a view similar to Fig. 7 showing the locking mechanism in its completely released position.
Figure 9:
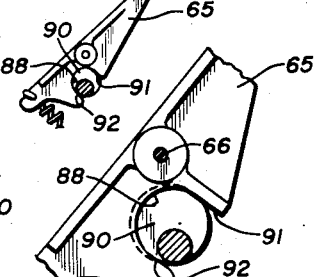
Fig. 9 is an enlarged view similar to views 7 and 8 showing a portion of the locking mechanism and the actuating cam therefor.

Referring now to Figs. 3, 4, and 5, the upper readout assembly is arranged within an upwardly projecting portion 52 of the casing 10. Each of the numeral wheel assemblies includes one of the knurled wheels 19 to which is attached a flange 53 on which the neutral position zero and the nine digits are marked at equally spaced intervals. All of the numeral wheels are mounted on a common shaft 54 secured in a series of brackets 55 attached to a longitudinal bar 56 extending across the front of the assembly. Each of the wheels 19 is biased to its predetermined neutral positions by a coiled spring 57 attached at one end to the bracket 55 and at its other end to the hub 9 on the wheel 19 indicated at 58. Adjacent each of the numeral wheel assemblies and on the side away from the indicator flange 53 there is mounted a switch assembly 60. The assembly 60 includes a four-fingered plate 61, the fingers being indicated at $a$, $b$, $c$, and $d$ respectively. The fingers of the plate 61 are of resilient conducting metal and in their normal position engage four contacts 62$a$, 62$b$, 62$c$, and 62$d$ respectively, thereby providing four normally closed switches. The contacts are connected respectively to four leads 63$a$, 63$b$, 63$c$, and 63$d$. The wheel 19 is held in any one of its eleven positions by a spring-pressed detent 65 pivoted at 66 on a bracket 67 which is secured to the front support 56. The detent 65 is held in engagement with a star wheel 70 formed as an integral part of the wheel 19 and having eleven equally spaced notches. Between the rim of the wheel 19 and the star wheel 70 there is arranged a set of raised cam surfaces 72, 73, 74, 75, 76, and 77, which are annular raised portions or projections concentric with the wheel 19. The ends of the fingers 62$a$, 62$b$, 62$c$, and 62$d$ are arranged to extend to the projections 72 to 77 inclusive and the ends of the fingers, as illustrated, are cut along an arc so that each of the fingers extends over the annular zone through which the projections move. All of the assemblies 60 are mounted on a longitudinal support 80 which extends the length of the readout assembly and is mounted for limited movement longitudinally thereof. The support 80 is attached by a link 81 to an armature 82 of a solenoid 83, and, upon energization of the solenoid, the support 80 is moved in a direction from right to left as viewed in Figs. 1 and 4, and brings the finger assemblies 61 into engagement with the wheels 19. Those fingers which engage one of the projections 72 to 77, inclusive, will be caught or stopped and, as the bar 80 moves further, the engagement between that finger and its corresponding one of the contacts 62$a$, $b$, $c$, and $d$ will be broken. In each of the eleven positions of the wheel 19, the fingers of the assembly 61 will be in engagement with a different combination of the projections on the wheel 19. This provides combinations of opened and closed switches which are employed in a coded arrangement in the manner described in the aforesaid copending application. In one position, which is the neutral position of the wheel, that is the position when the wheel lies against its stop, the four fingers of the assembly 61 will engage the single projection 77 and all contacts will be held open. In this position, no signal can be transmitted through the switch fingers. This is the neutral position which prevents readout from any of the indicator wheel assemblies which have their wheels in the neutral position. In the position of the parts of the assembly, shown in Figs. 5 and 6, a detent 65 is held against the star wheel 70 by the spring 68, and upon movement of the wheel 19 to select its position, the detent moves from one notch of the star wheel to the selected notch. When it is desired to read out the positions of all the indicator wheels which have been selected, the wheels are locked by moving the lever 21 to its top position as shown by dotted lines in Fig. 3. This movement rotates a gear 85 counterclockwise and a gear 86 clockwise. The gear 86 is on a shaft 87 which extends through notches or recesses 88 in each of the detents 65. The shaft 87 is notched at intervals, each notch being opposite one of the detents 65 and the notch is formed by machining a portion of the shaft away so that an eccentric portion 90, clearly shown in Fig. 9, lies within the notch 88. Upon clockwise rotation of the gear 86 and shaft 87, a portion 90 rests against the edge 91 of the detent 65 and rotates the detent about its pivot 66 to the position shown in Fig. 7 where it is in firm engagement with the star wheel 70, thereby locking the star wheel against further movement and holding all of the wheels 19 locked in position. After the operator has finished using the information indicated by the positions of the wheel 19, all of the wheels may be returned to their neutral position by moving the lever 21 to its lowermost position, indicated in Fig. 3. On movement to this position, the wheel 86 and shaft 87 are rotated in a counterclockwise direction and the eccentric portions 90 of the shaft 87 are brought into engagement with the side 92 of the recess 88 opposite side 91 as shown in Fig. 8; this moves the detent 65 completely out of engagement with the star wheels and all of the wheels 19 are returned to their neutral positions by their respective springs 57.

I claim:

1. A mechanical indicating apparatus comprising a rotatable indicating wheel, means biasing said wheel to an initial position, a toothed wheel secured to said indicating wheel concentrically therewith, a pivoted detent mounted adjacent said toothed wheel and having a projection movable into engagement therewith, means for biasing said detent into engagement with said wheel, a cam mounted adjacent said detent and movable from a position out of engagement therewith into a first position for moving said detent out of engagement with said toothed wheel and into a second position for forcing said detent against said toothed wheel to lock said indicating wheel in position.

2. A mechanical indicating apparatus as set forth in claim 1, wherein said detent is formed to provide an opening and said cam lies within the opening and engages portions of the side walls of the opening in said first and second positions.

3. A mechanical indicating apparatus as set forth in claim 2 wherein the opening in said detent is in the form of a pair of jaws and wherein said cam comprises a reduced eccentric portion of rotatable shaft mounted on an axis parallel to the pivotal axis of said detent and having a diameter greater than the width of said jaws, portions of said shaft adjacent said cam engaging said detent on both faces of said jaws and retaining said detent against axial displacement.

4. A mechanical indicating apparatus comprising a plurality of rotatable indicating wheels mounted on a common axis, means biasing each of said wheels to an initial position, stop means for each of said wheels providing a plurality of spaced stop positions, a movable detent for each of said wheels biased toward the respective stop means for holding each wheel in selected positions, cam means adjacent each of said wheels movable to a first position for moving the respective detent out of engagement with said stop means to release said wheels and to a second position for pressing said detents forcibly against said stop means for locking each wheel in its selected position, and actuating means for moving all of said cams simultaneously to corresponding positions.

5. A mechanical indicating apparatus comprising a rotatable indicating wheel, means biasing said wheel to a predetermined initial position, retaining means yieldable upon movement of said wheel for holding said wheel in selected positions when rotated thereto in opposition to said biasing means, means operably connected with said retaining means movable into two positions, one for urging said retaining means forcibly into engagement with said wheel for locking said wheel against rotation and the other position for releasing said retaining means to allow said wheel to return to its initial position; electric read-out means dependent upon the position of said wheel for producing a signal corresponding to the position of the wheel, means effective when said wheel is in its initial position for rendering said readout means ineffective; said readout means including a plurality of normally closed switches and actuating fingers therefor positioned adjacent said wheel and movable into engagement therewith, and stops on said wheel positioned to engage predetermined ones of said fingers to open selected ones of said switches in coded order corresponding to the selected positions of said wheel, and said means for rendering said readout means ineffective comprising a stop for engaging all of said fingers to hold all of said switches in their open position upon movement of said fingers into engagement with said wheel.

References Cited in the file of this patent

UNITED STATES PATENTS

| | | |
|---|---|---|
| 2,113,229 | Bryce | Apr. 5, 1938 |
| 2,127,733 | Herbst | Aug. 23, 1938 |
| 2,289,055 | Landsiedel | July 7, 1942 |
| 2,302,769 | Haselton et al. | Nov. 24, 1942 |
| 2,480,981 | Thierfelder | Sept. 6, 1949 |
| 2,545,550 | Jordan | Mar. 20, 1951 |